United States Patent Office

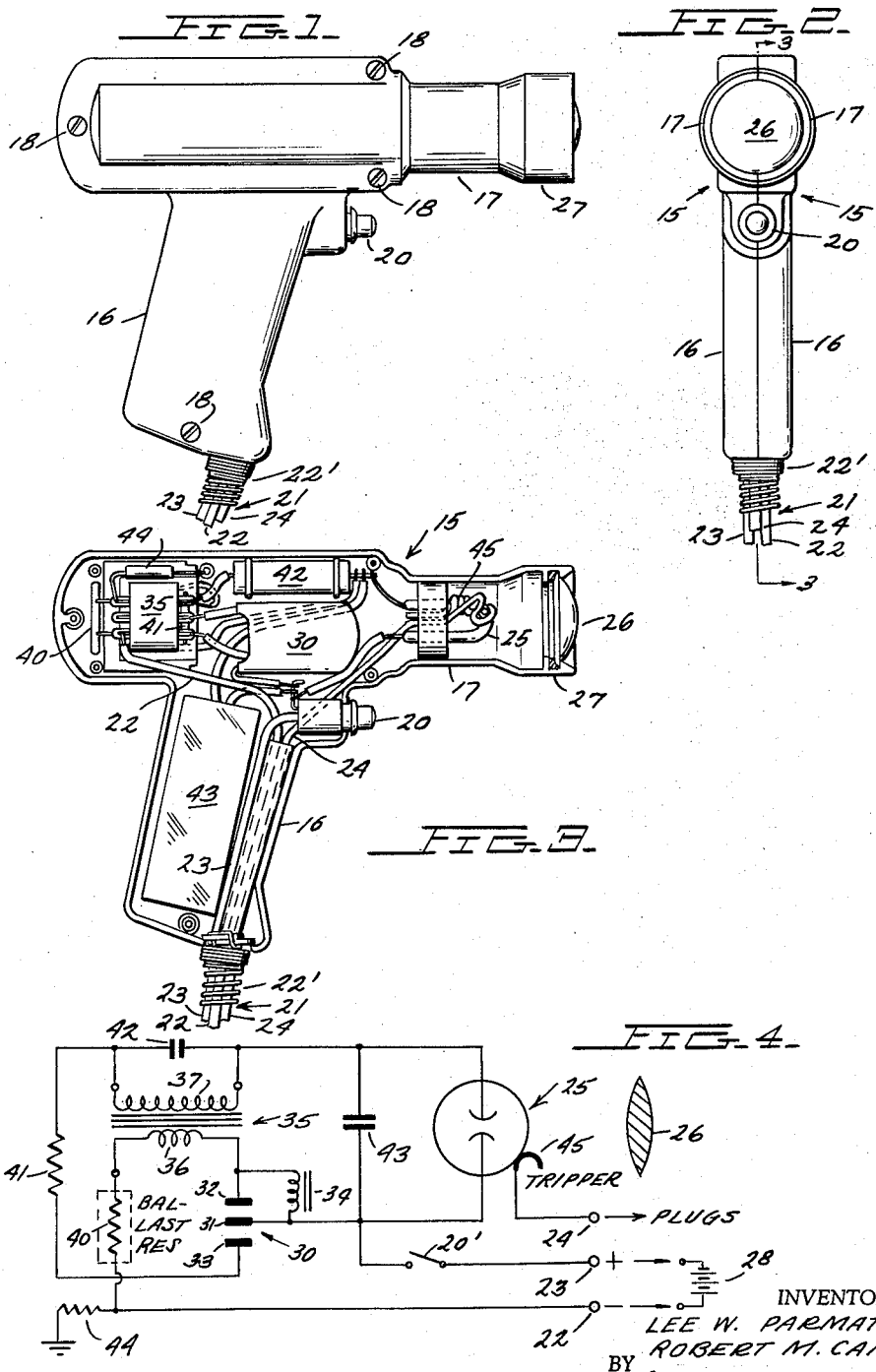

2,959,711
Patented Nov. 8, 1960

2,959,711

PORTABLE IGNITION TIMING LIGHT

Lee W. Parmater, 10131 Riverview Drive, and Robert M. Cain, 3932 Canterbury Drive, both of Kalamazoo, Mich.

Filed May 29, 1958, Ser. No. 738,716

3 Claims. (Cl. 315—224)

The present invention relates to stroboscopic testing devices, and more particularly to a novel portable timing light for ascertaining ignition timing of automobile cylinders.

In general, it is common to use a stroboscopic light flashing on a rotating engine part such as a flywheel which is periodically illuminated by the light for the purpose of determining whether or not a plug is firing at the proper time.

Such timing lights obtain their energy either directly from the ignition spark or from an external source under control of the ignition. The present invention relates to battery-operated timing lights which are powered from the car battery through a vibrator and which utilize a flash bulb of the type that is ignited under control of impulses from a spark plug line. Prior art lights have heretofore been known for this purpose, which were of relatively costly construction and which used more battery current than needed for the reason that the light was energized even when not in use unless disconnected from the battery.

Further, prior art lights usable for both six and twelve volt ignition systems required expensive relays to set the circuit for one voltage or the other, which relays were not always reliable in operation particularly if the battery voltage was not up to rated value. Failure of the relay to operate when it should, resulted in damage to the light. Under certain conditions, as in starting up the engine where the voltage regulator is set a little too high, there would be produced a voltage surge before the relay could function, and damage to the circuit components results.

The above drawbacks are overcome in the present invention by providing a novel timing light of general configuration resembling a gun with a button at substantially trigger position to be pressed when the light is to be energized for the timing determinations. Thus, a mechanic putting the light "gun" down, would naturally release the button and would not have to disconnect the cables of the unit from the battery to prevent battery current from being needlessly dissipated.

The novel circuit used herein is small, and sufficiently light in weight, to be fully enclosed in the "gun" casing. Thus a fully portable, self-contained timing light unit is afforded by my invention, which is easy to handle, aim and use.

Further, the present invention uses a novel ballast resistance circuit in conjunction with the light flash circuit which automatically drops the voltage from a twelve-volt battery to a six-volt range for its operation, thereby eliminating the need for the heretofore used relays, and being more reliable in operation.

It is accordingly an object of the present invention to provide a novel and useful timing light that is portable, self-contained and in the form of a gun.

Another object of the present invention is to provide a novel stroboscopic timing light circuit incorporating a ballast resistor which automatically converts the operation for six or twelve volt battery usage.

A further object of the present invention is to provide a novel timing light circuit and construction which is "on" only when actually used for timing determinations, and automatically kept "off" at other intervals of connection to the battery.

The above and other objects and advantages of this invention will become apparent from the following description of an exemplary embodiment thereof taken in conjunction with the drawings, in which:

Figure 1 is an elevational view showing the timing light as a pistol or gun-shaped object.

Figure 2 is a front view of the timing light "gun."

Figure 3 is a plan view of the internal construction of the exemplary timing unit.

Figure 4 is a schematic electrical diagram of the timing light circuit.

Referring to the figures, the invention timing light is in the form of a gun or pistol readily held in one's hand. It is self-contained within two body halves 15, 15 each having handle or "gun butt" portions 16, 16 and lens barrel sections 17, 17. The two body halves 15, 15 mate and are closed together with suitable recessed screws 18, 18. A trigger switch 20 extends from butt sections 16, 16 at the index finger location for ready control action.

The three-lead cable 21 extends below the handle 16, for connections to be described. A helical spring 22' stabilizes the cable to the unit. The casing 15, 15 is cast preferably of aluminum for light-weight and ruggedness in use. Cable 21 comprises three leads. Leads 22, 23 are for the car or a standby storage battery and lead 24 for connection to the spark plugs to be tested, as will be set forth.

An important feature of the herein invention is the ready portability, compactness and self-contained arrangement of the whole unit. The body interior of the "gun" unit readily mounts the electrical components of the novel timing light circuit hereof. The timing light is a suitable bright flash tube 25, operable at several hundred volts in its flash mode. A conventional lens 26 focuses the flash ahead of the "gun" barrel in use thereof. Lens 26 is mounted at the forward end 27. The other circuit components are suitably mounted within the hollow casing formed by the body halves 15, 15.

The exemplary ignition timing circuit is schematically shown in Figure 4. An electromechanical vibrator 30 is arranged to periodically apply battery (28) current through the primary winding 36 of step-up transformer 35. When trigger 20 presses switch 20' to close, battery cables 22, 23 pass a current surge through vibrator coil 34, transformer primary 36 and a ballast resistor 40 in series. A resistor 44, as 150 ohms, connects cable 22 to ground. Vibratory contact 31 thereupon closes on fixed contact 32, short-circuiting coil 34. Contact 31 is thereby released, and swings against fixed back contact 33. Contact 33 connects to one end of secondary winding 37 of transformer 35 through a limiting resistor 41, such as 1000 ohms.

The current surge or pulse through primary winding 36 creates a stepped-up voltage across the terminals of secondary winding 37, having a condenser 42 in shunt connection therewith. A suitable value for condenser 42 is .024 mfd. While back-contact 33 is connected with vibrating contact 31 the transformer 35 output circuit is completed through flash tube 25. A large stabilizing condenser 43, such as 2 mfd. with high rating at 600 volts is shunted across tube 25. The opening of contact 31 from contact 32 meanwhile permits reenergization of vibrator coil 34 to reattract reed contact 31 against contact 32. Thus another surge of current is passed through primary winding 36 when contacts 31 and 32 reestablish, in turn deenergizing coil 34.

The aforesaid operation persists while trigger 20 maintains contact 20' closed by finger pressure. When the trigger 20 is released its associated spring opens switch 20' and returns the trigger 20 button to "off" condition. While switch 20' is closed or "on," vibrator 31 operates to intermittently pass current surges through transformer primary winding 36 and establish a high voltage across flash tube 25 and its condenser 43, as will be understood by those skilled in the art.

When switch 20' is open or "off" no such high voltage is built up across tube 25, and the tube cannot therefore flash while the trigger 20 is unpressed. In this manner no system component operation or power waste occurs when not needed or used. When the operator wishes to use the stroboscopic operation for the testing, he simply presses trigger 20 and aims the unit's lens 26 to the target. The flashing circuit operation is thereupon immediately effective as well.

In using the invention unit, the tripper element 45 associated with flash tube 25 is connected through cable lead 24 to a spark plug, preferably the No. 1 spark plug of a warmed up internal combustion engine, such as a passenger automobile engine. With condenser 43 charged-up with suitably high voltage, tube 25 will flash upon firing of the spark plug. Such tube 25 flashing occurs in synchronism with the spark plug (not shown) firing, producing brilliant flashes through lens 26 to the target.

Engine timing is checked by noting the position of a mark on the car flywheel or balancer at the time the No. 1 spark plug fires. The unit is designed to flash a brilliant beam of light of extremely short duration at the instant the spark fires at the plug. Timing checks made are therefore accurate and easy to make. The vehicle manufacturers' specifications are best consulted for information and instructions concerning the timing mark on the particular engine to be checked.

With the engine warmed up and idling, the trigger 20 is pressed and the light pointed at the recommended timing mark. If the engine timing is correct, the mark will be seen in accordance with the manufacturers' recommendation.

The preferred method of timing some cars is at a higher speed than idling with the distributor vacuum line disconnected. A tachometer makes it possible to accurately time at these specific speeds. If the mark does not show at the proper location, the lock screw holding the distributor is loosened and the distributor housing rotated slowly until the mark is seen in accordance with the manufacturer's recommendation.

A further advantageous and important feature of the present invention is the novel and practical provision for automatically operating the circuit of Figure 4 from either a six-volt or the newere car twelve-volt battery. This is a two-to-one difference. In the prior art a voltage-sensitive relay was used to modify or select the proper circuit for the voltage to which it is applied. In accordance with the present invention this is accomplished directly through the series ballast resistor 40. The resistive value of ballast 40 has no appreciable effect upon the vibratory circuit 31, 35 or its operation when a six-volt battery is applied at 28. However, when a twelve-volt battery is applied, the resistance of ballast 40 increases appreciably to maintain the normal and proper operation of the circuit thereof.

The ballast resistor 40 is used herein for voltage regulation. The ballast resistor 40 has a great advantage over use of a relay. This advantage is as follows: A timing light unit which uses a relay for making this voltage adjustment usually has this relay adjusted to close at about nine-volts so that when connected to six volts, it does not operate but when connected to twelve volts, it does operate. Under certain conditions, such as in starting the engine where possibly the voltage regulator is set a little too high, there is a voltage surge of some duration before the voltage regulator can function. If this surge were, say, eight and one-half volts it would not be sufficient to close the relay, but would be of sufficient strength to cause damage to the components of the light which are, of course, in connection for six-volt operation until the relay closes. Voltage control with the herein ballast resistor 40, has the distinct advantage of giving continuous regulation from five to twenty volts automatically.

While we have described and illustrated our invention it is to be understood that modifications thereof, or in its use, may be made by those skilled in the art, and that it is not intended to be limited except as set forth in the following claims.

We claim:

1. A timing light unit of the character described operable from a D.C. voltage source with a voltage range over two-to-one comprising a flash tube for emitting light flashes under control of spark impulses, means connectible to one of said voltage sources for energizing said tube including a vibrator and a step-up transformer in circuit relation with said vibrator, and circuit means for automatically regulating the voltage applied to said tube energizing means to a value for effective operation thereof including a ballast resistor.

2. A timing light unit as claimed in claim 1, in which said ballast resistor is connected in series with the primary winding of said step-up transformer.

3. A timing light unit as claimed in claim 1, in which the vibrator coil, ballast resistor and the primary winding of said step-up transformer are connected in electrical series, with the external voltage source being applicable to the series circuit.

References Cited in the file of this patent

UNITED STATES PATENTS

| | | |
|---|---|---|
| 1,806,796 | Gates | May 26, 1931 |
| 2,043,676 | Raskhodoff | June 9, 1936 |
| 2,086,910 | Hansell | July 13, 1937 |
| 2,703,376 | Board | Mar. 1, 1955 |
| 2,747,158 | Le Bel | May 22, 1956 |
| 2,751,581 | Waltman | June 19, 1956 |
| 2,836,784 | Gross | May 27, 1958 |